Oct. 27, 1959 M. T. LUDVIGSON 2,910,655
AUTOMATIC ANTENNA COUPLER
Filed Oct. 9, 1958
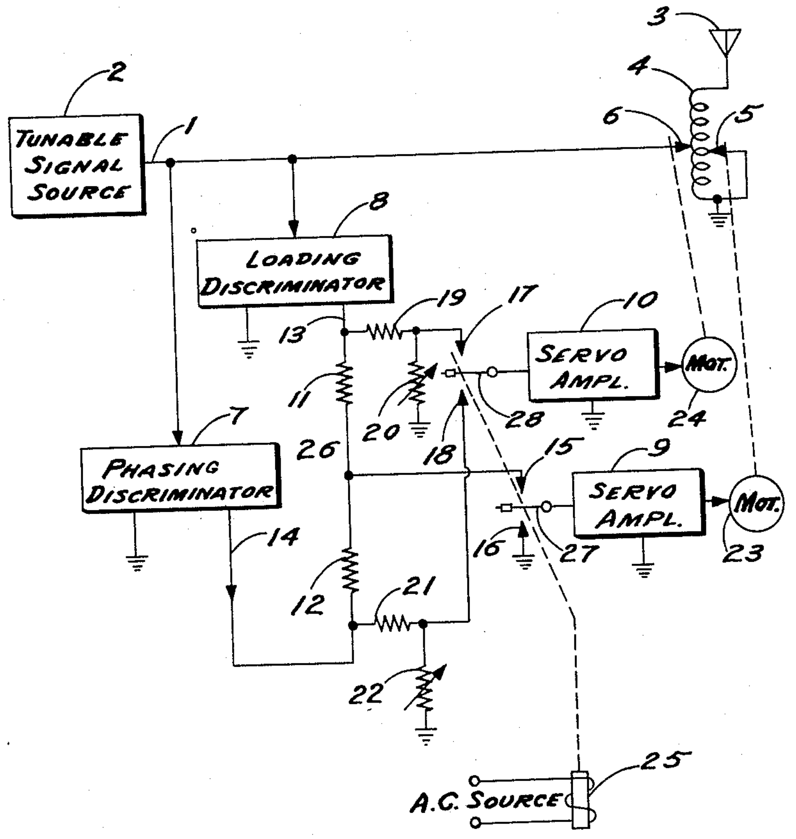
INVENTOR.
MERRILL T. LUDVIGSON
BY Marvin Moody
ATTORNEY
Glenn H. Antrim
AGENT

United States Patent Office 2,910,655

Patented Oct. 27, 1959

2,910,655

AUTOMATIC ANTENNA COUPLER

Merrill T. Ludvigson, Cedar Rapids, Iowa, assignor to Collins Radio Company, Cedar Rapids, Iowa, a corporation of Iowa Application October 9, 1958, Serial No. 766,242

3 Claims. (Cl. 333—17)

This invention pertains to automatically controlled networks which match impedances of loads to respective lines and pertains particularly to control circuits of servo systems for operating loading elements and tuning elements of the respective networks.

The control circuits of this invention may be applied to various impedance matching systems. Its operation may be readily understood by reference to the automatic antenna coupler described in the application for United States patent, Serial Number 623,088, filed November 19, 1956, by Samuel L. Broadhead, Jr. and Merrill T. Ludvigson. The system described therein includes a tapped variable inductor, the tap being connected to an incoming line and the entire variable inductor being connected across an antenna circuit. An end shorting variable contact of the inductor is positioned to vary the inductance which is connected across the antenna circuit, and thereby, to tune the antenna; an intermediate tap is positioned to properly load the antenna by matching the impedance of the antenna circuit to the impedance of the incoming line. In order to extend the operation of the coupler over a very wide frequency range, a variable capacitor and a connecting switch are used in conjunction with the inductor for connecting the capacitor either in parallel with the variable inductor and the antenna circuit or in series with the variable inductor and the antenna circuit. In the system described in the cited application, the total inductance of the inductor, the tap on the inductor, the capacitor connecting switch and the capacitor are varied in the proper sequence automatically by servo systems to match the impedance of the antenna to that of the incoming line for obtaining maximum transfer of power from the incoming line to the antenna.

In impedance matching systems such as described above, variation in the total inductance of the inductor mainly for tuning will also likely change the impedance match, and likewise a variation of tap for mainly matching impedances will also likely change the tuning of the load circuit. In a system that is controlled automatically, the loading control system and the impedance matching system will, therefore, operate either simultaneously or alternately until the antenna or load circuit is properly tuned and the impedance of the load matches the impedance of the antenna.

At certain frequencies, especially those near the limit of the frequency range of operation of the impedance matching system, the automatic controls for the inductor may tend to interchange function. For example, a moderate amount of adjustment of the loading control may tend to change the tuning more than that which can be obtained by operation of that control which, over most of the range of its operation, is usually most effective in changing tuning. Usually, in impedance matching systems that are operated automatically, control voltages for servo amplifiers are developed by a phase sensing discriminator and a load sensing discriminator that have inputs connected to the input line of the impedance matching system. Normally the output of each of the sensing discriminators is connected to a respective input of only that servo system which controls the reactive element that, over most of the frequency range of the impedance matching system, is most effective in changing that characteristic which is normally measured by the sensing discriminator. In the system described herein both a loading discriminator and a phasing discriminator are connected to a single control circuit which is connected to both a loading servo system and a tuning servo system. The discriminator that has the greater output at a particular time may, therefore, be most effective in operating both servo systems.

An object of the present invention is to couple both the phasing discriminator and the loading discriminator of an impedance matching system to both the tuning servo system and the loading servo system so that either discriminator may at times dominate control of both servo systems. The following description and the appended claims may be more readily understood with reference to the accompanying single figure which shows schematically the coupling circuit of this invention integrated within a block diagram of an impedance matching system.

An incoming line 1 connects a tunable signal source 2 to a resonant load 3. The load is connected to ground through the variable inductor 4. This inductor has a variable contact 5 for varying the total inductance of the inductor and a variable tap 6 for determining the proportion of the inductor that is between the incoming line and ground. The variable contact 5 is effective over most of the frequency range of the system to tune the load and the variable tap 6 is most effective to determine the degree to which load 3 is reflected back to incoming line 1. The inputs of phasing discriminator 7 and loading discriminator 8 are connected to the incoming line 1. The phasing discriminator develops a voltage that is a function of the phase between the voltage and current on the line, and the loading discriminator develops a voltage that is a function of the current-to-voltage ratio.

In systems that do not operate over an extremely wide frequency range, the output of phasing discriminator 7 may be coupled directly to the input of servo amplifier 9 that controls the position of variable contact 5 to tune the output load 3. Also, the output of loading discriminator 8 may be connected directly to the input of servo amplifier 10 that controls the position of variable tap 6 of inductor 4 to match the impedance of output load 3 to the impedance of incoming line 1. In the instant impedance matching system, the outputs of the loading and the phasing discriminators are connected to a common coupling circuit which applies the outputs of the discriminators through a continuously operating switching means, an electrical chopper, to the inputs of both servo amplifiers 9 and 10.

In the particular embodiment shown in the accompanying figure, resistors 11 and 12, that generally have equal resistances, are connected between output 13 of loading discriminator 8 and output 14 of phasing discriminator 7. The junction 26 of resistors 11 and 12 is connected to contact 15 that is alternately contacted by chopper armature 27. An opposite chopper contact 16 is connected to ground. When the chopper is in operation, the mean of the discriminator output voltages, with respect to ground, and the common ground are applied alternately to servo amplifier 9. An alternating-current voltage having a peak voltage equal to the mean voltage is, therefore, applied to the input of amplifier 9. This voltage is amplified and applied to an operating winding of motor 23 that is coupled to variable contact 5 of the inductor 4.

The outputs of loading discriminator 8 and phasing discriminator 7 are connected to chopper contacts 17 and 18 respectively to be applied alternately through vibrating armature 28 to the input of servo amplifier 10. An alternating-current voltage that has a peak-to-peak amplitude proportional to the difference between the voltages developed by the discriminator is, therefore, amplified by servo amplifier 10 to operate motor 24 for positioning variable tap 6 of variable inductor 4. In order that the voltages derived from the discriminators 7 and 8 for application to the servo amplifiers be the optimum values for deriving the most stable operation, individual voltage adjusting dividers have been inserted between the outputs of the discriminators and respective contacts that are connected alternately to servo amplifier 10. The voltage divider for the output of the loading discriminator includes series dropping resistor 19 and shunt adjustable resistor 20 and a similar voltage divider for the output of the phasing discriminator 7 includes series resistor 21 and shunt adjustable resistor 22. Although an electromechanical vibrator has been shown in the switching circuit between the discriminators and the servo amplifiers, electronic multivibrator type switching circuits could be used if so desired. For simplicity, in the accompanying figure armatures 27 and 28 for the inputs of servo amplifiers 9 and 10 respectively are shown operated by a single driving coil 25 that is connected to a source of alternating current.

At the extreme end of the low-frequency range of the automatic antenna coupler shown in the accompanying drawing, antenna 3 appears to the incoming signal mainly as a capacitive reactance and requires large current to provide substantial radiation. At these frequencies, a change in position of variable contact 5 for changing the total inductance in the antenna circuit is very effective in tuning the antenna. Also, variation in the position of variable tap 6 is very effective in changing the loading that is reflected from the antenna to the incoming line 1. At the middle of the frequency range of the system, moderate change in positioning of the variable contact 5 is still quite effective in changing the tuning of the load. Therefore, servo amplifier 9 that controls the positioning of variable contact 5 operates well over the low-frequency and middle-frequency ranges to tune the load when the output of only the phasing discriminator 7 is connected directly to the input of the amplifier according to arrangements used in prior systems. Also, variation of tap 6 of inductor 4 is still quite effective in changing loading so that for the middle frequency range of operation, the input of servo amplifier 10 that controls the positioning of the tap could be connected directly to the output of only the loading discriminator 8 to obtain satisfactory control.

At higher frequencies, the resistance of the antenna becomes comparatively large, and a moderate change in position of variable tap 6 becomes more effective than change in the position of variable contact 5 for tuning the antenna. Also, contrary to the operation at lower frequencies, change in position of tap 6 has little effect on changing the loading that is reflected from the antenna 3 to the incoming line 1. Therefore, at the high-frequency end of the range, tuning of the load 3 is more readily accomplished by having the input of servo amplifier 10 connected to the output of phasing discriminator 7 for controlling the position of variable tap 6. By connecting the input of servo amplifier 10 through chopper contacts, as shown in the accompanying figure, to the outputs of both the phasing discriminator and the loading discriminator, the amplifier is controlled predominantly at any one time by that discriminator which is developing a larger voltage. At the high-frequency end of the range, servo amplifier 10 would then obviously be controlled predominantly by phasing discriminator 7.

The improved control circuit of this invention insures control voltages of required polarity for varying the adjustable inductor in the proper direction regardless of the reversal in polarity in output voltage from either the loading discriminator or the phasing discriminator at an extreme end of the range of the inductor. The voltage of that discriminator in which the reversal occurs is weaker than that from the other discriminator and the stronger voltage is always of proper polarity for operating both the loading servo system and the phasing servo system. Therefore, proper operation of the system is insured over a wider permissable range inductance than that possible in prior systems.

In certain applications it may be necessary to connect the input of only one of the servo amplifiers through a chopper to both discriminators, the other servo amplifier being connected directly to a respective one of the discriminators. Although the servo control circuits of this invention have been described relative to a single embodiment shown in the accompanying figure, changes obvious to those skilled in the art may be made and still be within the spirit and scope of the following claims.

What is claimed is:

1. In an impedance matching system of wide frequency range having an incoming line for receiving at different times signals that have different frequencies, an output load, a loading discriminator and a phasing discriminator with individual inputs respectively connected to said incoming line, a reactive element connected between said input line and said output load, servo means for adjusting said reactive element for matching the impedance of said load to the impedance of said incoming line; servo control voltage coupling circuits for coupling the outputs of said discriminators to the input of said servo means comprising, a voltage divider connected between the output of said loading discriminator and the output of said phasing discriminator, switching means for alternately connecting the input of said servo means to two preselected points of different potential on said voltage divider, whereby that one of said discriminators developing the greater voltage at a particular time is predominant in adjusting said reactive element by said servo means.

2. In an impedance matching system of wide frequency range having an incoming line for receiving at different times signals that have different frequencies, an output load, a loading discriminator and a phasing discriminator with individual inputs respectively connected to said incoming line, a reactive element connected between said input line and said output load, said reactive element having first and second adjustable devices for tuning said load to the frequency of the signal that is applied to said incoming line and for matching the impedance of said load to the impedance of said incoming line, said first adjustable device being mainly for tuning, said second adjustable device being mainly for matching impedance, and having first and second servo systems with individual outputs operably connected to said first and second adjustable devices respectively; servo control voltage coupling circuits for coupling the outputs of said discriminators to the inputs of said servo systems comprising, a voltage divider connected between the output of said loading discriminator and the output of said phasing discriminator, switching means for each of said servo systems for alternately connecting the input of the respective one of said servo systems to two preselected points of different potential on said voltage divider, whereby that one of said discriminators developing the greater voltage at a particular time is predominant in controlling positioning of said adjustable devices by said servo systems.

3. In an impedance matching system of wide frequency range having an incoming line for receiving at different times signals that have different frequencies, an output load, a loading discriminator and a phasing discriminator with individual inputs respectively connected to said incoming line, a reactive element connected between said incoming line and said output load, said reactive element having first and second adjustable devices for tuning said load to the frequency of the signal that is applied to said incoming line and for matching the impedance of said load to the impedance of said incoming line, said first adjustable device being mainly for tuning, said second adjustable device being mainly for matching impedance, and having first and second servo systems with individual outputs operably connected to said first and second adjustable devices respectively; servo control voltage coupling circuits for coupling the outputs of said discriminators to the inputs of said servo systems comprising, a center tapped resistive network connected between the output of said loading discriminator and the output of said phasing discriminator, a common return circuit for said discriminators and said servo systems, first electrical chopper means for connecting the input of said first servo system alternately to the center tap of said resistive network and to said common return circuit for applying to said last input voltage which is the mean of the voltages applied to said network from said discriminators, and second electrical chopper means for connecting the input of said second servo system alternately to the output of said loading discriminator and to the output of said phasing discriminator, whereby that one of said discriminators developing the greater voltage at a particular time is predominant in controlling positioning of said adjustable devices by said servo systems.

References Cited in the file of this patent

UNITED STATES PATENTS 2,742,618 Weber ---------------- Apr. 17, 1956